Oct. 7, 1930.  T. A. WILLARD  1,777,538
RADIO APPARATUS
Filed Aug. 7, 1922
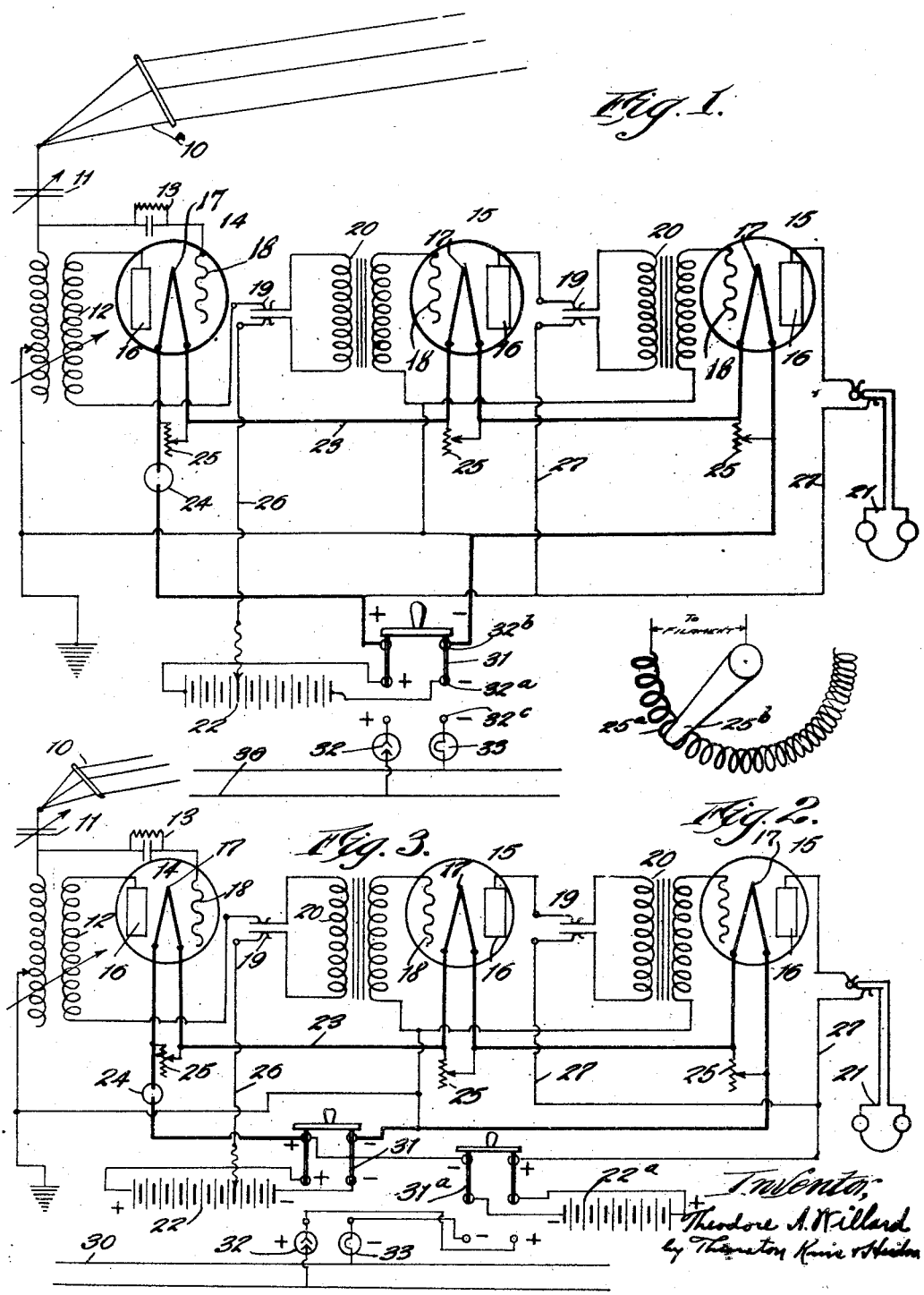

Patented Oct. 7, 1930

1,777,538

UNITED STATES PATENT OFFICE

THEODORE A. WILLARD, OF CLEVELAND HEIGHTS, OHIO, ASSIGNOR, BY MESNE ASSIGNMENTS, TO RADIO CORPORATION OF AMERICA, OF NEW YORK, N. Y., A CORPORATION OF DELAWARE

RADIO APPARATUS

Application filed August 7, 1922. Serial No. 580,233.

This invention relates to radio sets and has for its object to provide certain improvements which increase the efficiency and sensitiveness of a radio set, and permits the set to be operated with a single battery usually known as the "B" battery and to dispense with the so-called "A" battery which is the most troublesome battery to keep charged and in good order.

The present improvements though believed to be applicable to both receiving and sending sets apply especially to receiving sets, and for the sake of simplicity reference is made particularly herein to receiving sets. A receiving set as at present used generally consists of a variable condenser, tuning coils, vario-coupler and other well known parts, and contains a plurality of audion bulbs, the filaments of which are energized by a so-called "A" battery to which the bulbs are connected in parallel, a rheostat being provided in the series with each filament. Additionally, there is usually a so-called "B" battery of a higher voltage than the "A" battery for exciting the plates of the bulbs.

The filaments use a relatively large current for their energization, generally about one ampere each, and as the filaments are connected in multiple, they consume a large amount of current which naturally necessitates frequent charging of the "A" battery which must be of generous size. In accordance with the present invention a single battery is employed for heating or energizing the filaments and exciting the plates of the bulbs, and the filaments are connected in series instead of in parallel, each being shunted by a variable resistance. This materially reduces the amount of current required for energizing the filaments and permits the size of the battery cells to be reduced, but requires, of course, a higher voltage which the relative high voltage "B" battery provides. At the same time better results are obtained in the clearness and intensity of the signals received or sent, this being due, I now believe, to a more harmonious working of the different parts because of the normally fixed relationship of the voltages impressed thereon by reason of the fact that they are connected to the same instead of different batteries as heretofore. It may be due also to regenerative action arising from the fact that the plate current traverses through all of the filaments.

The invention may be further briefly summarized as consisting in certain novel combinations and arrangements of parts which will be described in the specification and set forth in the appended claims.

Though my invention is not limited to any particular circuit, I have for the sake of simplicity shown my invention applied to a single circuit regenerative receiving set, this circuit being shown by way of example of the many different circuits now in use or capable of use with all of which my invention may be used with equal facility.

In the drawings, Fig. 1 is a diagrammatic representation of the particular circuit referred to; Fig. 2 represents a form of filament shunting resistance which I prefer to employ; and Fig. 3 is a view similar to Fig. 1 showing a modification.

In the drawings, the parts well known and shown in the usual conventional way need be only very briefly referred to. These include the antennæ 10; the variable condenser 11, the vario-coupler 12; the grid condenser and grid leak 13; the detector audion tube 14; amplifying audion tubes 15, (two of which are here illustrated) each tube 14 and 15 having a plate 16, a filament 17 and a grid 18. Additionally the parts include telephone jacks 19, amplifying transformers 20 and the telephone receivers 21.

In accordance with my invention as shown in Fig. 1, a single battery 22 is employed for energizing or heating the filaments 17 of all the audion bulbs and for exciting the plates 16 thereof, the size and number of the cells depending, of course, on the size and characteristics of the tubes. I have in practice obtained very good results from the system herein illustrated employing a battery having twenty-four cells of two volts per cell.

The filaments 17 of all the tubes are connected in series between the positive and negative terminals of the battery 22 instead of being connected in parallel as heretofore, the circuit in which the filaments and battery are serially connected being designated 23. In this circuit is placed a resistance 24 which in order to render my improvements effective must be on the positive side of the battery or between the positive terminal of the battery and the first of the singly connected filaments, which in this instance is the filament of the detector tube 14. The amount of this resistance is just sufficient to give the filaments the proper incandescence to enable them to emit the necessary electrons to produce the desired effect, or it may be of such an amount that it will allow a slightly greater electron emission than required.

This resistance may be of any suitable material, but it may advantageously be a so-called ballast lamp having a heating element of a metal such as iron which will rapidly increase in resistance should the circuit be overloaded, thereby protecting the bulbs from being burned out. For example, it might be found advisable to use more battery on the plates of the amplifying tubes and should the user accidentally place the additional battery in the filament circuit the ballast lamp would take care of the increased voltage. However, as before stated, I do not confine myself to a ballast lamp and the part designated 24 may be a plain resistance with a rising characteristic or otherwise.

Shunting or connected in parallel with each filament 17 is an adjustable resistance or rheostat 25. Obviously when the rheostat is adjusted so as to cut in resistance the current flowing through the filament is increased, and when it is adjusted so as to cut out resistance the current flowing through the filament is decreased. In this manner the incandescence of the different filaments can be independently adjusted to give the best results or the best signals. In other words, the rheostats rob or deprive the filaments of some current more or less as required to bring the incandescence to the proper degree for the right electron emission.

The rheostats 25 may be of different forms, but that illustrated in Fig. 2 is very satisfactory. As here illustrated it consists of a coiled resistance wire 25ª and a movable rheostat arm 25ᵇ which directly engages the coils. The ohmic resistance of the wire per unit length gradually increases from the left to the right hand ends of the coil. This can be accomplished by gradually decreasing the distance between the coils or gradually increasing the fineness of the wire, or both, as here illustrated. A rheostat of this type though of small size permits the use of bulbs of varying sizes, one taking say one ampere, and another a fraction of an ampere, say one-fourth ampere.

When the rheostat arm is at its extreme left hand position the resistance is entirely cut out of the circuit and practically no current will pass through the filament of the bulb shunted by the rheostat and the bulb can be removed if desired. Generally, however, when the bulb is to be removed enough resistance is left in the circuit to compensate for the resistance of the filament, in which event the small resistance section in the circuit will carry the entire current without undue heating. As the arm is moved toward the right the resistance around the filament is gradually increased, and when the arm is at the extreme right hand position practically the full current passes through the filament.

Referring again to Fig. 1, it will be observed that the plate 16 of the detector tube 14 is connected by conductor 26 to an intermediate terminal of the battery 22, the point of connection being variable to suit conditions of the tubes. It will be observed also that the plates 16 of the amplifying tubes are connected by conductors 27 to the positive terminal of the battery 22 so that the full voltage thereof is impressed on the plates.

In addition to the improvements above described, wherein the filaments of the several audion bulbs are connected in series, each in multiple with a rheostat or adjustable resistance, to the terminals of the battery, I provide a battery charging unit with simple and easily actuated switching means for connecting the battery either to the charging circuit or in proper relation to the circuits of the radio set. In Fig. 1 the conductors of an alternating current charging circuit which may be a 110 volt lighting circuit are designated by the reference character 30. The charging set here shown includes a double-pole, double-throw switch 31, a rectifier 32 and a resistance here indicated as a lamp 33. The terminals of the battery 22 are connected to the middle stationary terminals 32ª of the switch. The terminals of the filament circuit 23 are connected to one pair of stationary contacts indicated at 32ᵇ and the rectifier 32 and lamp 33 are connected between the conductors 20 and a second pair of contacts indicated at 32ᶜ. Obviously by throwing the switch from one position or side to the other, the battery may be connected to the circuits of the radio set, as shown in Fig. 1, or to the charging circuit. On account of the very small amount of current necessary to charge the battery 22, the rectifier is not of very large size and it can be an electrolytic rectifier as shown, which is well adapted for small outputs. I do not, however, confine myself to an electrolytic rectifier as the set may be operated from a direct current circuit through a resistance consisting of a lamp or other suitable resistance, or the battery may be charged from an alternating current source with a vibrating rectifier or a suitable rectifier of some other form.

In the operation of this apparatus we will assume that the battery is on charge and that the switch is thrown down to the opposite position from that shown. The charging rate of the battery is arranged to suit the requirements and the lamp bulb is of the proper size to give enough current to properly charge the battery in the necessary number of hours. The usual procedure is to put into the circuit a lamp resistance that will allow enough current to flow into the battery in a given time to make up for the amount of current taken out in a given time while using the radio set. For example, let it be assumed that the receiving set is used for a period of two hours. During this time in a set having three bulbs as shown connected in series, each bulb being of a size to require substantially one ampere, approximately two ampere-hours will be consumed. If the proper sized lamp is placed in the circuit to allow .1 of an ampere to pass, during twenty-two hours 2.2 ampere-hours will be put into the battery, this allowing .2 of an ampere-hour in excess as is usual. If the set is used for several periods of two hours each during the twenty-four, the size of the lamp bulb may be increased so as to increase the amount of current which charges the battery, or in extreme cases, if necessary, several lamps may be used in multiple, making it possible to replenish the battery in a relatively short period of time.

This system is economical and the operation is extremely simple, it being only necessary to throw the switch in one direction or to one position while the set is being used, and then in the other direction, and to allow it to remain in that position so as to charge the battery until it is necessary to again use the set. It is assumed, of course, that a lamp 33 of proper size is used, having in mind the period of time that the set was in use and the battery discharging, and therefore the period of time that the battery will be on charge to compensate for the current consumed.

In using the set, in this instance for receiving, the rheostats 25 will be adjusted so that the right electron emission will take place in the different bulbs. As previously stated, the lamps being serially connected, the draw from the battery in amperes is in the case of a three bulb circuit one-third of that when the filaments of the bulbs are connected in multiple as heretofore, and as already stated, the serially connected filaments with their independently adjustable rheostats shunting them, permit the use, in the same set, of bulbs requiring different amounts of current. It should be noted also, that since the filaments and plates are all connected to the same battery, the voltage relationship of the filaments and plates is the same in the sense that a change of voltage on one part is accompanied by a change of voltage on the other part while the set is in use, after the necessary adjustments of the rheostats 25 have been made.

The above system is applicable to sets in which there are bulbs and transformers for both radio and audio frequency amplifications such as sets using three bulbs for radio frequency, one detector bulb and two or more bulbs for audio frequency. With a set of this kind with the filaments connected in the usual way to an "A" battery, the draw from the battery would be approximately six amperes assuming that the set had six bulbs each taking one ampere. But with my invention with the filaments serially connected, the draw from the battery will be approximately one ampere, but, of course, the resistance or ballast 24 would be less.

In Fig. 1 the voltage impressed upon the plates of the tubes is sufficiently high for ordinary conditions of operation, but in some instances it may be desirable to employ an unusually high plate voltage. In such a case another battery which may be coupled to the main battery so as to impress on the plates the voltage of both, may be utilized. In that case the battery 22 will be relied on to supply current to the filaments, and the additional battery for supplying the increased plate voltage will have a sufficient number of cells to supply the added voltage and may be of relatively low ampere-hour capacity.

If the voltage of this second battery is the same as the voltage of the battery 22, both batteries can be conveniently charged at the same time with a single charging set such as already described. In Fig. 3 an arrangement suitable for this purpose is illustrated. In this figure the battery 22 is connected as heretofore and the auxiliary battery is shown at 22$^a$. Two double-pole double-throw switches 31 and 31$^a$ are in this instance provided, these switches serving, when thrown to their upper positions, to connect the battery 22 to the filament circuit and the two batteries 22 and 22$^a$ in series in the plate circuit. On the other hand when the batteries are to be charged, the switches are thrown down and this connects both batteries in parallel to the charging set so that both will be charged simultaneously. If desired, the two switches may be connected together so as to be operated in unison either up or down.

In the event the battery 22$^a$ does not have the same number of cells or same voltage as battery 22 it may be connected to the charging circuit independently of the battery 22, and if an A. C. charging circuit is used, a separate rectifier and lamp resistance such as already described may be used.

As far as I am aware, I am the first to connect the filaments of the several audion bulbs in series to the terminals of the battery and particularly to the same battery which excites the plates of the bulbs, with each filament shunted by its adjustable rheostat. This last mentioned feature is, of course, necessary for the attainment of good results, for otherwise the full value of the different bulbs could not be realized on account of the fact that each succeeding bulb cuts the voltage of the battery and would unbalance the system. This, of course, is compensated for by the adjustment of the rheostats 25. In consequence the bulbs can be "evened up" and though in the last bulb the plate will have a slightly lower voltage, this can be compensated for by increasing the excitation of the associated filament to cause it to more freely give off electrons. In this manner the passage of the electrons may be made uniform in all the bulbs.

I have found that with a set connected in accordance with my invention, better results are obtained than with the bulbs in multiple, the incoming signals being heard much more distinctly and giving the set a far greater range. The specific reason for this is not definitely known but as already stated, it may be due to the fact that some kind of a harmonious action is obtained by reason of the fact that the filaments are energized and the plates excited from the same battery which is not true of ordinary sets, or it may be due to some kind of an improved regenerative action possibly due to the fact that the plate current passes through the serially connected filaments of the different bulbs. At any rate I have demonstrated that my improved set delivers the signals clearly and louder and receives more distant signals and delivers them at the same loudness as a regular set does signals that are sent from a less distant point.

I do not desire to be confined to the precise details shown or to the specific simple receiving circuit illustrated, for as already stated, in certain portions of the specification, the invention may be used in other receiving circuits and the principal features of the invention are adaptable for sending as well as receiving sets.

Having described my invention, I claim:

1. In a radio set, a plurality of audion bulbs, a battery for energizing the filaments of the bulbs and for exciting the plates of the bulbs, the filaments being connected in series to the terminals of the battery, each filament being shunted by an independently adjustable rheostat.

2. In a radio set, a plurality of audion bulbs which have filaments connected in series, and a single source of current for energizing the filaments and exciting the plates of the bulbs.

In testimony whereof, I hereunto affix my signature.

THEODORE A. WILLARD.